US011790415B2

(12) United States Patent
Edwards et al.

(10) Patent No.: US 11,790,415 B2
(45) Date of Patent: Oct. 17, 2023

(54) ROUTE DETERMINATION BASED ON LAST KNOWN POSITION

(71) Applicant: Capital One Services, LLC, McLean, VA (US)

(72) Inventors: Joshua Edwards, Philadelphia, PA (US); Michael Mossoba, Arlington, VA (US); Abdelkader M'Hamed Benkreira, New York, NY (US)

(73) Assignee: Capital One Services, LLC, McLean, VA (US)

( * ) Notice: Subject to any disclaimer, the term of this patent is extended or adjusted under 35 U.S.C. 154(b) by 470 days.

(21) Appl. No.: 17/125,518

(22) Filed: Dec. 17, 2020

(65) Prior Publication Data
US 2022/0198537 A1    Jun. 23, 2022

(51) Int. Cl.
| G06Q 30/00 | (2023.01) |
| G06Q 30/04 | (2012.01) |
| H04W 4/029 | (2018.01) |
| G01C 21/34 | (2006.01) |
| G06Q 30/018 | (2023.01) |
| G06Q 50/30 | (2012.01) |

(52) U.S. Cl.
CPC .......... *G06Q 30/04* (2013.01); *G01C 21/343* (2013.01); *G06Q 30/0185* (2013.01); *H04W 4/029* (2018.02); G06Q 50/30 (2013.01)

(58) Field of Classification Search
CPC .... G06Q 30/04; G06Q 30/0185; G06Q 50/30; H04W 4/029; G01C 21/343
See application file for complete search history.

(56) References Cited

U.S. PATENT DOCUMENTS

| 8,606,710 B2 | 12/2013 | Park |
| 2019/0279510 A1 | 9/2019 | O'Sullivan |
| 2020/0272955 A1 * | 8/2020 | Shimodaira ........ G01C 21/3438 |

FOREIGN PATENT DOCUMENTS

| DE | 112018003024 T5 * | 3/2020 | ............. B60R 25/24 |
| DE | 102020135073 A1 * | 7/2021 | ......... G01C 21/3415 |
| RU | 2397544 C2 | 8/2010 | |

* cited by examiner

*Primary Examiner* — Alvin L Brown
(74) *Attorney, Agent, or Firm* — Harrity & Harrity, LLP

(57) ABSTRACT

In some implementations, a system may receive information that identifies a plurality of locations of a user device. The system may determine, based on the plurality of locations, that the user device is traveling along a route associated with a vehicle. The system may determine route information that indicates a plurality of disembarkation points along the route. The system may determine that reception of location information from the user device has failed, after determining that the user device is traveling along the route. The system may identify a set of disembarkation points based on determining that reception of location information from the user device has failed and based on a most recent location of the user device. The system may determine a disembarkation point, from the set of disembarkation points, to be used as an endpoint of the route.

20 Claims, 7 Drawing Sheets

ROUTE DETERMINATION BASED ON LAST KNOWN POSITION

BACKGROUND

Location tracking is used to monitor the location, movement, and/or behavior of a device. Location tracking can be achieved through a tracking device, associated with the device, that can include a positioning system and an electronic device capable of wireless communication. Data provided by the tracking device can be transmitted to a remotely-located device by wireless communication to permit the remotely-located device to track the device. The remotely-located device can determine routing or navigation information for the device based on the data provided by the tracking device.

SUMMARY

In some implementations, a system for determining a route associated with a user device traveling in a vehicle after reception of location information from the user device fails includes memory and one or more processors, communicatively coupled to the memory, configured to: determine, based on a first location of the user device at a first time, that the user device is traveling in the vehicle, where the vehicle is associated with the route; determine route information that indicates the route associated with the vehicle in which the user device is traveling, where the route information identifies a plurality of disembarkation points associated with the route; receive information that indicates a second location of the user device at a second time subsequent to the first time; determine that reception of location information from the user device has failed, after receiving the information that indicates the second location of the user device; identify one or more disembarkation points, of the plurality of disembarkation points, based on determining that reception of location information has failed, based on the route information, and based on the second location of the user device; and transmit, to the user device, a message that indicates the one or more disembarkation points.

In some implementations, a method for determining a disembarkation point along a route associated with a user device traveling in a vehicle after reception of location information from the user device fails includes receiving, by a system and from the user device, information that identifies a plurality of locations of the user device; determining, by the system and based on the plurality of locations, that the user device is traveling along the route associated with the vehicle; determining, by the system, route information that indicates a plurality of disembarkation points along the route; determining, by the system, that reception of location information from the user device has failed, after determining that the user device is traveling along the route; identifying, by the system, a set of disembarkation points, of the plurality of disembarkation points, based on determining that reception of location information from the user device has failed and based on a most recent location, of the plurality of locations, of the user device; and determining, by the system, at least one of a disembarkation point to be used as an endpoint of the route or a charge to be used for the route based on the set of disembarkation points.

In some implementations, a non-transitory computer-readable medium storing a set of instructions for determining a disembarkation point along a route associated with a user device traveling in a vehicle after reception of location information from the user device fails includes one or more instructions that, when executed by one or more processors of a system, cause the system to: determine, based on a location of the user device, that the user device is traveling in the vehicle; determine route information that indicates the route associated with the vehicle in which the user device is traveling, where the route information identifies: a plurality of disembarkation points associated with the route, and a distance or a time between consecutive disembarkation points of the plurality of disembarkation points; determine a polling interval, to be used to receive location updates from the user device, based on the distance or the time between consecutive disembarkation points; obtain one or more location updates from the user device based on the polling interval; determine, based on expiration of a timer that has a duration that is based on the polling interval, that reception of location information from the user device has failed; identify one or more disembarkation points, of the plurality of disembarkation points, based on determining that reception of location information has failed, based on the route information, and based on a most recent location update of the one or more location updates; and determine at least one of a disembarkation point to be used as an endpoint of the route or a charge to be used for the route based on the one or more disembarkation points.

DETAILED DESCRIPTION

Figure 1A:
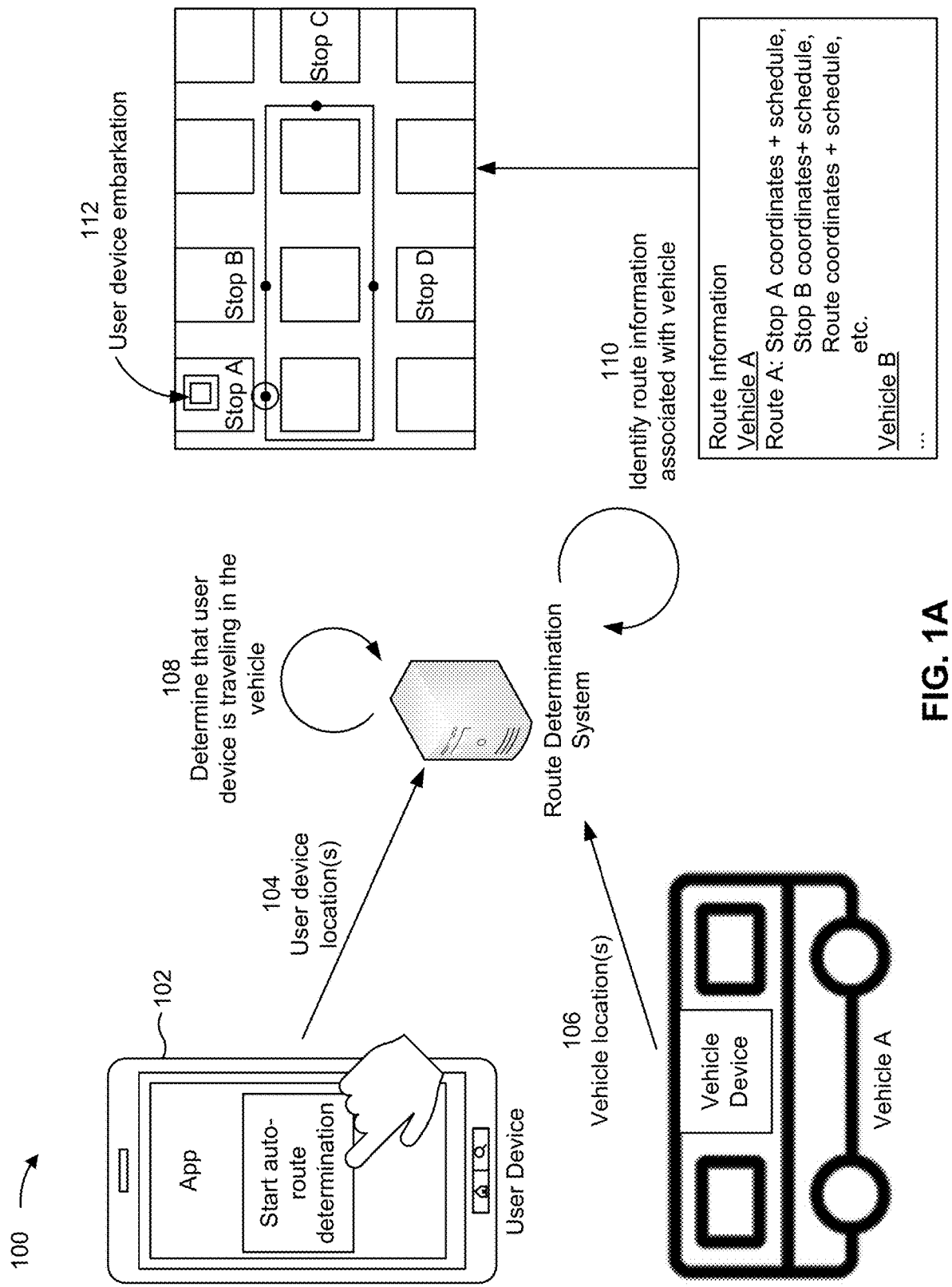
FIGS. 1A-1D are diagrams of an example implementation relating to route determination based on a last known position.

The following detailed description of example implementations refers to the accompanying drawings. The same reference numbers in different drawings may identify the same or similar elements.

A user may use a transportation system, such as a bus system, a train system, and/or a subway system. The transportation system may include a vehicle (e.g., a bus, a train, and/or a car) that travels along a predetermined route that includes multiple stops at which the user may enter the vehicle (e.g., an embarkation point) to begin use of the transportation system or at which the user may exit the vehicle (e.g., a disembarkation point) to stop use of the transportation system. In some cases, the user may pay for the use of the transportation system by processing a payment for the use prior to onboarding a vehicle of the transportation system (e.g., by purchasing a ticket prior to using the transportation system). This may cause delays associated with using the transportation system because the user has to take time to purchase a fare before embarking on the vehicle. Moreover, a user may pay too much or too little for the use of the transportation system because the payment must be processed prior to the actual use of the transportation system.

In some cases, the user may be associated with a user device that is capable of using a positioning system, such as a global positioning system (GPS). The user device may be capable of determining and/or transmitting location information (e.g., a position) of the user device. Similarly, vehicles of the transportation system may be capable of using positioning systems that can determine and/or transmit location information (e.g., a position) of the vehicle. The location information of the user device and the location information of the vehicle can be used to determine when the user is using the transportation system. However, it is difficult to determine when the user device and the vehicle begin to be co-located (e.g., at an embarkation point) and when the user device and the vehicle are no longer co-located (e.g., at a disembarkation point) because the user device and the vehicle may be transmitting location information at different intervals, at different granularities or accuracy levels, and/or may not be transmitting location information regularly. Additionally, transmitting location information associated with the user device and/or vehicle may consume significant computing resources, networking resources, and/or power resources (e.g., battery power).

Moreover, in some cases, a user device and/or a vehicle may be unable to transmit location information while the user is using the transportation system. For example, the user device may experience poor communication conditions (e.g., the user device may lose communication connectivity with a network) such that the user device is unable to transmit location information, such as when the user device is underground, in a tunnel, and/or in a poor coverage area. Additionally, or alternatively, the user device may receive an instruction (e.g., from the user) to stop sharing location information of the user device. Additionally, or alternatively, the user device may be turned off or enter a power saving mode (e.g., the user may turn the user device off and/or a battery of the user device may become low or die) while the user is using the transportation system, such that the user device is unable to transmit location information. If the user exits the vehicle (e.g., at a disembarkation point) to stop use of the transportation system while the user device is unable to transmit location information, then it is difficult to determine the disembarkation point associated with the user. As a result, it is difficult to determine a length of use or a distance that the user has used the transportation system.

Some implementations described herein enable route determination based on a last known position. A system may be provided for determining a route associated with a user device traveling in a vehicle after reception (e.g., by the system) of location information from the user device fails. For example, the system may determine, based on location information of the user device and the vehicle, that the user device is traveling in the vehicle along a route. The route may include multiple disembarkation points at which a user may exit the vehicle. The system may receive a location of the user device after the user device begins traveling in the vehicle that indicates that the user device is still traveling in the vehicle along the route. The system may determine that reception of location information from the user device has failed after receiving the location of the user device. The system may identify one or more potential disembarkation points, from the multiple disembarkation points, based on determining that reception of location information has failed, based on the route information, and based on the last known location of the user device. For example, the system may identify one or more disembarkation points along the route that are closest in proximity to the last known location of the user device. In some implementations, the system may receive an updated location of the user device after receiving the last known location of the user device. If the updated location indicates that the user device is still traveling in the vehicle, then the system may disregard the failed reception of the location information. If the updated location indicates that the user device is no longer traveling in the vehicle, then the system may identify one or more disembarkation points that include each disembarkation point prior to and including a disembarkation point that is closest in proximity to the updated location.

In some implementations, the system may transmit an indication of the one or more potential disembarkation points to the user device to enable a user of the user device to select a disembarkation point that was used by the user. In some implementations, the system may automatically select a disembarkation point from the one or more potential disembarkation points. Based on determining the disembarkation point, the system may calculate a charge based on the determined disembarkation point. As a result, the system may be enabled to determine a disembarkation point of the user device when reception of location information associated with the user device fails. This enables the system to more accurately determine a route associated with the user device when the user device is traveling in the vehicle.

FIGS. 1A-1D are diagrams of an example 100 associated with route determination based on a last known position. As shown in FIGS. 1A-1D, example 100 includes a route determination system that communicates with a user device and a vehicle device. In some implementations, the route determination system may communicate with an account management device. These devices are described in more detail in connection with FIGS. 2 and 3.

As shown in FIG. 1A, and by reference number 102, the user device may be provided with an application for automatic route determination. In some implementations, the application may be associated with a transportation system. The application may instruct the user device to determine and/or transmit location information (e.g., a position, such as coordinates, and/or movement information, such as a speed and/or heading) associated with the user device to the route determination system. In some implementations, the application may request access to location information associated with the user device. As shown in FIG. 1A, the user device may receive an input, from a user, to start automatic route determination. In some implementations, based on receiving the input from the user, the application may instruct the user device to begin sharing location information associated with the user device with the route determination system.

In some implementations, the user may provide the input to start automatic route determination when the user enters a vehicle, such as a vehicle A shown in FIG. 1A, associated with a transportation system. For example, the user may provide the input to start automatic route determination based on beginning a trip using the transportation system. In some implementations, the user may provide the input to start automatic route determination before the user enters the vehicle associated with a transportation system. For example, the user may provide the input to start automatic route determination prior to beginning a trip using the transportation system, such as when the user arrives at a terminal or station associated with the transportation system. In some implementations, the user may provide the input to start automatic route determination to enable the application to share location information associated with the user device with the route determination system such that the user is not required to remember to begin sharing location information (e.g., as the application may be enabled to share location information while executing in the background of the user device).

In some implementations, the user device may receive an indication from another device (such as the vehicle device)

to start automatic route determination. For example, the user device may communicate (e.g., via Bluetooth or near field communication) with the other device, such as when the user enters vehicle A, at a turnstile, at a doorway, at a seat, at a stop, and/or at station, among other examples. The user device may receive the indication to start automatic route determination based on communicating with the other device at a location that indicates that the user device has, or is about to, begin travelling in vehicle A. In some implementations, the user device may autonomously (e.g., without receiving an input) start automatic route determination based on a location of the user device (e.g., based on a location of the user device indicating it is on a route, near a stop, and/or otherwise indicating that the user device has, or is about to, begin travelling in vehicle A).

In some implementations, the application may provide an indication (e.g., a warning or an alert) to be displayed on the user device to not disable location sharing of the user device while the user device is traveling in a vehicle. For example, after receiving the input to start automatic route determination, the application may provide a warning that if location sharing is disabled by the user, then the application may be unable to perform the automatic route determination (and/or that a higher charge may be applied to an account of the user when the user is using a transportation system).

In some implementations, the route determination system may determine movement information (e.g., speed, acceleration, and/or heading) of the user device when the user device (and/or the application) receives the input to start automatic route determination. For example, the route determination system may determine if the user device was moving or was stationary (or had a speed below a threshold) when the user device (and/or the application) received the input to start automatic route determination. If the route determination system determines that the user device was moving (e.g., has a speed and/or acceleration above the threshold), then the route determination system may determine a potential fraud instance because the user device may have already been traveling on a vehicle when the user device (and/or the application) received the input to start automatic route determination. For example, if the route determination system identified an embarkation point of the user device based on when the user device received the input to start automatic route determination (or based on a first location provided by the user device to the route determination system after the input to start automatic route determination), then the determined embarkation point may be later in a route than an actual embarkation point, resulting in a lower charge for the use of the transportation system. Therefore, if the route determination system determines that the user device was moving (e.g., has a speed and/or acceleration above the threshold) when the user device received the input to start automatic route determination, then the route determination system may flag or otherwise indicate a potential fraud instance associated with the user device. In some implementations, the route determination system may determine that an embarkation point was a most recent stop prior to the location at which the user device (and/or the application) receives the input to start automatic route determination (e.g., if the route determination system determines that there was no fraudulent intent associated with the potential fraud instance).

As shown by reference number 104, the route determination system may receive, from the route determination system, one or more user device locations (e.g., locations of the user device). In some implementations, the user device may transmit the one or more user device locations based on receiving a request for location information from the route determination system. In some implementations, the user device may transmit the one or more user device locations based on a polling interval or periodic schedule indicated by the route determination system, as described in more detail below. In some implementations, the user device may transmit location information (e.g., one or more locations) of the user device based on the application executing on the user device.

As shown by reference number 106, the route determination system may receive, from a vehicle device associated with a vehicle A, one or more vehicle locations (e.g., locations of vehicle A). In some implementations, the vehicle device may transmit the one or more vehicle locations based on receiving a request for location information from the route determination system. In some implementations, the vehicle device may transmit the one or more vehicle locations based on a polling interval or periodic schedule indicated by the route determination system, as described in more detail below.

As shown by reference number 108, the route determination system may determine that the user device is traveling in vehicle A. In some implementations, the route determination system may determine that the user device is traveling in vehicle A based on the one or more user device locations and the one or more vehicle locations. For example, the route determination system may determine that a user device location is proximate to a vehicle location at a first time (e.g., indicating that the user device and vehicle A are in the same place at the same time). The route determinate system may determine that the user device location remains proximate to the vehicle location for a number of consecutive instances after the first time (e.g., indicating that the user device and vehicle A are traveling together). In some implementations, the route determination system may determine that the user device is traveling in vehicle A based on the number of consecutive instances satisfying a threshold. In some implementations, the route determination system may compare user device movement information (e.g., speed and/or heading) to vehicle movement information to determine that the user device is traveling in vehicle A (e.g., to determine if the user device and vehicle A are traveling at the same, or similar, speeds and/or headings).

In some implementations, the route determination system may determine that the user device is traveling in vehicle A without using the one or more vehicle locations. For example, the route determination system may identify one or more routes associated with a transportation system. The route determination system may determine, based on the one or more user device locations, that the user device is traveling along a route of the one or more routes. The route determination system may determine that the user device is traveling along the route at the same, or approximately the same, time and location that a vehicle (e.g., vehicle A) is scheduled to be traveling along the route. The route determination system may determine that the user device is traveling in vehicle A based on determining that the user device is traveling along the route at the same, or approximately the same, time and location that vehicle A is scheduled to be traveling along the route.

In some implementations, the route determination system may determine that the user device is traveling in vehicle A based on an indication received from the user device and/or the vehicle device. For example, upon entering vehicle A, the user may provide an input to the user device causing the user device to transmit an indication to the route determination system that the user device is traveling in vehicle A. In some implementations, upon entering vehicle A, the user device may be scanned or otherwise read by an operator of vehicle A. This may cause the user device and/or the vehicle device to transmit an indication to the route determination system that the user device is traveling in vehicle A. For example, an operator of vehicle A may scan an indicator, such as a Quick Response (QR) code, displayed on the user device that provides an indication of an identifier associated with the user device. The vehicle device may provide an indication of the identifier associated with the user device to the route determination system to indicate that the user device is traveling in vehicle A. In some implementations, the user device (or the application) may receive an input of an identifier associated with vehicle A (and/or a route associated with vehicle A). The user device may transmit an indication of the identifier associated with vehicle A to the route determination system to indicate that the user device is traveling in vehicle A.

In some implementations, the route determination system may determine that the user device is traveling in vehicle A based on a network used by the user device to transmit the one or more user device locations. For example, vehicle A may provide a wireless local area network (WLAN), such as a Wi-Fi network, to users traveling in vehicle A. The route determination system may determine that the user device is traveling in vehicle A based on receiving the one or more user device locations via the network associated with vehicle A.

As shown by reference number 110, the route determination system may identify route information associated with vehicle A. The route information may include multiple stops (e.g., embarkation and/or disembarkation points) and a schedule associated with the multiple stops. For example, the route information may include locations (e.g., coordinates) of the multiple stops. The route information may indicate a schedule indicating when vehicle A is expected to be at each of the multiple stops. For example, for each stop, the route information may indicate a time that vehicle A is scheduled to arrive and/or leave the stop. In some implementations, the route information may indicate an amount of time between each stop of the multiple stops (e.g., the route information may indicate that vehicle A is expected to arrive at a second stop 10 minutes after leaving a first stop). For example, as shown in FIG. 1A, the route of vehicle A may include a stop A, a stop B, a stop C, and a stop D. The route information may indicate that vehicle A is scheduled to arrive at stop A at a first time, followed by stop B at a second time, followed by stop C at a third time, and followed by stop D at a fourth time.

As shown by reference number 112, the route determination system may identify a user device embarkation point. The user device embarkation point may be the stop at which the user device began traveling in the vehicle. The route determination system may identify the user device embarkation point based on the determined location at which the user device began traveling in the vehicle, as described above. For example, the route determination system may determine that the user device embarkation point is the most recent prior stop (e.g., identified in the route information associated with vehicle A) before the route determination system determined that the user device is traveling in vehicle A. In some implementations, the route determination system may determine the user device embarkation point based on an indication received from the user device and/or the vehicle device (e.g., the user device and/or the vehicle device may indicate the user device embarkation point).

For example, as shown in FIG. 1A, the route determination system may determine that the user device embarkation point is stop A. The route determination system may determine that the user device embarkation point is stop A based on determining that the user device is traveling in vehicle A when the user device and the vehicle A are located at stop A or are located at a position along the route after stop A but before stop B.

Figure 1B:
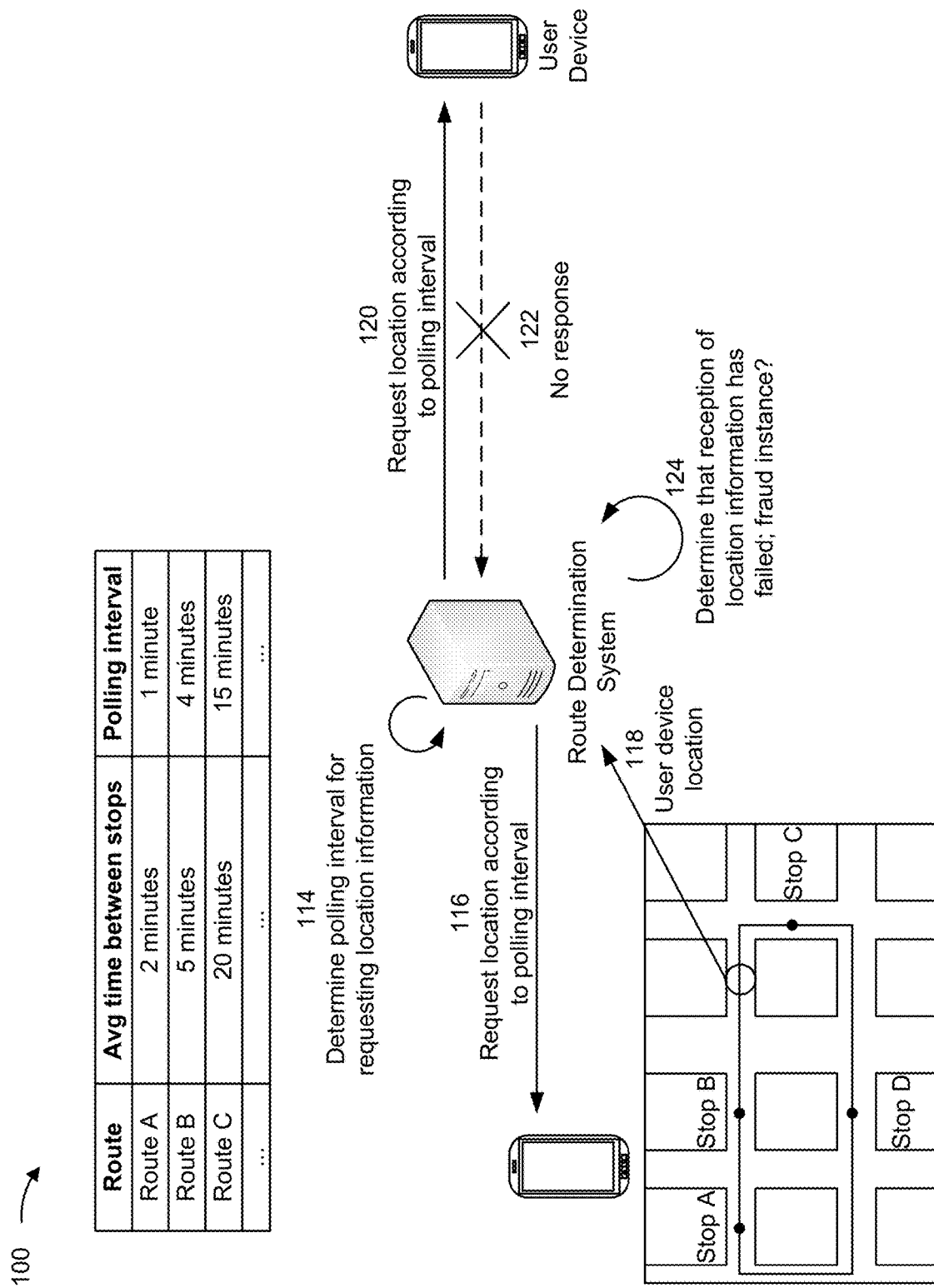

As shown in FIG. 1B, and by reference number 114, the route determination system may determine a polling interval for obtaining location information from the user device. For example, the polling interval may be used to receive location updates from the user device. The polling interval may indicate an amount of time for a period between obtaining location information from the user device. For example, the polling interval may indicate a periodic schedule associated with requesting and/or receiving location information from the user device. In some implementations, the route determination system may determine the polling interval for a route based on an average time between stops of the route. For example, the route determination system may determine the polling interval such that location information is obtained at least once between each stop of a route.

In some implementations, the polling interval may be a shorter interval if the distance or the time between consecutive stops of the route is smaller or may be a longer interval if the distance or the time between consecutive stops of the route is larger. For example, as shown in FIG. 1B, the route determination system may determine a polling interval of 1 minute for a route A that has an average time between stops of 2 minutes. The route determination system may determine a polling interval of 4 minute for a route B that has an average time between stops of 5 minutes. The route determination system may determine a polling interval of 15 minutes for a route C that has an average time between stops of 20 minutes. Therefore, if a route has a large amount of time or distance between stops, the route determination system may obtain the user device location information of a user device traveling along the route less frequently. In this way, the route determination system may conserve processing resources, network resources, and/or power resources (e.g., of the user device) associated with communicating the user device location information that would have otherwise been used to communicate user device location information when the user device has not had an opportunity to stop traveling along the route.

In some implementations, the polling interval may be based on a minimum time between stops of a route. For example, a route may have a minimum time between stops of 1 minute. The route determination system may determine that the polling interval is less than 1 minute (e.g., 30 seconds) to ensure that the location of the user device is polled at least one between each stop of a route. In some implementations, the polling interval may be based on a time between each stop (e.g., the polling interval may vary between stops). For example, route A may have a stop 1, a stop 2, a stop 3 and a stop 4. The time between stop 1 and stop 2 may be 4 minutes, the time between stop 2 and stop 3 may be 1 minute and the stop between stop 3 and stop 4 may be 1 minute. The polling interval between stop 1 and stop 2 may be 2 minutes (e.g., half of the time between stop 1 and stop 2), the polling interval between stop 2 and stop 3 may be 30 seconds, and the polling interval between stop 3 and stop 4 may be 30 seconds.

In some implementations, the polling interval may indicate an amount of time after leaving, or before arriving, at a stop along a route. For example, if the polling interval is 1 minute, the route determination system may poll the user device for location information 1 minute after leaving, or before arriving, at each stop along the route.

In some implementations, the route determination system may determine multiple polling intervals for the same route. The route determination system may determine different polling intervals based on where a vehicle is located along a route. For example, a route may include a stop A, a stop B, and a stop C. The route may have a time between stop A and stop B of 15 minutes and a time between stop B and stop C of 6 minutes. The route determination system may determine a first polling interval of 10 minutes to be used when a user device and/or vehicle is location between stop A and stop B and a second polling interval of 4 minutes to be used when a user device and/or vehicle is location between stop B and stop C.

In some implementations, the route determination system may determine the polling interval for a route based on historical information associated with the route. For example, the route determination system may determine that the historical information indicates one or more dead zones associated with a route. A dead zone may include one or more locations along the route or certain stops included in the route that are associated with historical failures to obtain user device location information. The route determination system may determine the polling interval to not obtain user device location information, or obtain user device location information less frequently, when the user device and/or vehicle A are located in or proximate to a dead zone associated with the route. In this way, the route determination system may conserve processing resources, network resources, and/or power resources (e.g., of the user device) associated with obtaining the user device location information that would have otherwise been used to attempt to obtain the user device location information while the user device is located in or proximate to a dead zone.

In some implementations, the route determination system may determine the polling interval for a route based on a mobile network operator (MNO) associated with the user device. For example, different MNOs may provide different coverage areas for user devices. As a result, an MNO may be associated with certain areas or locations that have poor (or no) cellular connectivity for user devices. The route determination system may determine an MNO associated with the user device. The route determination system may determine a cellular network coverage parameter associated with the MNO and an upcoming location along the route (e.g., indicating a cellular network coverage level provided by the MNO in the upcoming location). The route determination system may determine the polling interval for the user device based on the cellular network coverage parameter. For example, if the cellular network coverage parameter indicates poor, or no, cellular network coverage, then the route determination system may increase the polling interval or not obtain user device location information while the user device is located in, or proximate to, the upcoming location. If the cellular network coverage parameter indicates good cellular network coverage, then the route determination system may maintain or decrease the polling interval while the user device is located in, or proximate to, the upcoming location.

For example, in some implementations, vehicle A may include a first user device associated with MNO A and a second user device associated with MNO B. For an upcoming location, MNO A may be associated with a cellular network coverage parameter indicating poor cellular network coverage and MNO B may be associated with a cellular network coverage parameter indicating good cellular network coverage. The route determination system may determine that the polling interval for the first user device (associated with MNO A) is to be increased or polling should be stopped while vehicle A is located in, or proximate to, the upcoming location. The route determination system may determine that the polling interval for the second user device (associated with MNO B) is to be maintained (e.g., not adjusted) while vehicle A is located in, or proximate to, the upcoming location. This enables the route determination system to conserve processing resources, network resources, and/or power resources (e.g., of the user device) associated with obtaining the user device location information that would have otherwise been used to attempt to obtain the user device location information while the user device is located in or proximate to a location associated with a poor cellular network coverage parameter.

In some implementations, the route determination system may determine an updated polling interval for a route based on a current location of the user device and/or vehicle traveling along the route. For example, the route determination system may determine an updated polling interval for the route based on a proximity of the user device and/or vehicle to a next stop included in the route. The route determination system may determine that the user device and/or vehicle are proximate (e.g., within a threshold amount of time or a threshold distance) to a next stop included in the route based on a schedule indicated by the route information of the route and/or based on a location update received from the user device and/or vehicle A (e.g., as described above). The route determination system may determine that the updated polling interval is less than the polling interval associated with the route. In other words, when the user device and/or vehicle get closer to a stop along the route, the route determination system may obtain location information of the user device and/or the vehicle more frequently. For example, as shown in FIG. 1B, route A may be associated with a polling interval of 1 minute. The route determination system may determine that the user device is located proximate to a stop along route A. The route determination system may update the polling interval to 30 seconds based on determining that the user device is located proximate to the stop along route A. As a result, the route determination system may be enabled to receive more location information at more meaningful times (e.g., when the user device is proximate to a stop) because of the updated polling interval. This enables the route determination system to make a more accurate determination of when the user device stops traveling with the vehicle A, as described in more detail below. Moreover, this enables the route determination system to conserve processing resources, network resources, and/or power resources (e.g., of the user device) associated with obtaining the user device location information that would have otherwise been used to obtain user device location at the updated polling interval along the entire route.

In some implementations, the route determination system may determine an updated polling interval for a route based on movement information of the user device. For example, the route determination system may determine an updated polling interval for a route based on a speed or acceleration of the user device and/or vehicle A. The route determination system may determine a speed or acceleration of the user device and/or vehicle A (e.g., based on an explicit indication or an implicit indication, such as two locations of the user device and a time at which the user device was located at each location). The route determination system may determine an updated polling interval based on the determined speed or acceleration. For example, if the user device and/or vehicle A are traveling at higher speeds (e.g., above a threshold speed), then the route determination may decrease a polling interval associated with the route. This may enable the route determination system to obtain location information more frequently, thereby resulting in a more accurate determination of the location of the user device. If the user device and/or vehicle A are traveling at lower speeds (e.g., below a threshold speed), then the route determination may increase a polling interval associated with the route. This may enable the route determination system to obtain location information less frequently, thereby conserving processing resources, network resources, and/or power resources (e.g., of the user device) associated with obtaining the user device location information.

In some implementations, if the user device and/or vehicle A are traveling at higher speeds (e.g., above a threshold speed), then the route determination may increase a polling interval associated with the route as the higher speed may indicate that vehicle A is not going to stop (e.g., therefore, no users may be disembarking at the higher speeds). If the user device and/or vehicle A are traveling at lower speeds (e.g., below a threshold speed), then the route determination may decrease a polling interval associated with the route as the lower speed may indicate that vehicle A may be stopping soon (e.g., and users may be disembarking) and a more accurate determination of the location of the user device is needed.

In some implementations, the route determination system may determine a polling interval for a route based on a schedule associated with the route. For example, as described above, if the user device is located proximate to a stop along the route, then the route determination system may begin polling location information at a higher frequency. However, if the schedule associated with the route indicates that no vehicles are expected to be near the stop at that time, then the route determination system may not poll location information at a higher frequency from the user device or may not poll any location information from the user device. In some implementations, the route determination system may begin polling location information at a higher frequency (e.g., as described above) only if the user device is located proximate to a stop at the same, or approximately the same, time that a vehicle is expected to be at the stop (e.g., based on a schedule associated with the route). For example, a vehicle may be scheduled to arrive at a stop at 11:00. The route determination system may begin polling location information at a higher frequency (e.g., as described above) for a user device located proximate to the stop between 10:50 and 11:10.

As shown by reference number 116, the route determination system may obtain user device location information according to the polling interval (e.g., that is determined as described above). For example, the route determination system may transmit, to the user device, a request for location information associated with the user device according to the polling interval (e.g., according to a periodic schedule indicated by the polling interval). For example, for a user device traveling along route B shown in FIG. 1B, the route determination system may transmit a request for location information associated with the user device every 4 minutes. In some implementations, the route determination system may transmit, to the user device, an indication of the polling interval associated with the route that the user device is traveling along. The route determination system may instruct the user device to transmit location updates to the route determination system according to the polling interval. The user device may automatically transmit (e.g., without receiving a request) location information associated with the user device according to the polling interval.

As shown by reference number 118, the route determination system may receive an indication of a user device location. The route determination system may receive the indication of the user device location after determining that the user device is traveling in vehicle A, as described above. The user device location may indicate that the user device is still traveling along the route with vehicle A. As a result, the route determination system may determine that the user device is still traveling in the vehicle A.

In some implementations, the indication of the user device location may be a last known user device location. In some implementations, the user device may determine that the user device is about to be unable to transmit location information. The user device may transmit a "last gasp" message to the route determination system indicating the user device location. For example, the user device may determine that the user device is about to be powered off, about to lose cellular coverage, and/or is about to have a location sharing setting disabled, among other examples. The user device may transmit an indication of the location of the user device prior to being unable to transmit location information.

As shown by reference number 120, the route determination system may attempt to obtain user device location information according to the polling interval, as described above. As shown by reference number 122, the route determination system may determine that no response has been received to a request for location information. In some implementations, the route determination system may determine that the user device has not transmitted location information according to the polling interval (e.g., in the case that no request is transmitted by the route determination system).

As shown by reference number 124, the route determination system may determine that reception of location information from the user device has failed. The route determination system may determine that reception of location information has failed based on failing to obtain user device location information according to the polling interval, as described above. In some implementations, the route determination system may determine that reception of location information from the user device has failed based on an amount of time since a last location update from the user device. For example, the route determination system may determine that reception of location information from the user device has failed based on determining that a threshold amount of time has elapsed from the last reception of location information from the user device or from a last transmission of a request for location information. The threshold amount of time may be based on a distance or a time between at least two stops included in the route, an average distance or an average time between stops included in the route, the last known location of the user device (e.g., as described above in connection with reference number 118), and/or the polling interval configured for the user device, among other examples. For example, the route determination system may initiate a timer upon reception of location information from the user device or upon transmitting a request for location information to the user device. An amount of time associated with the timer may correspond to the threshold amount of time. The route determination system may determine that reception of location information from the user device has failed based on an expiration of the timer.

In some implementations, the route determination system may determine whether the failure of the reception of location information from the user device is a potential fraud instance. A potential fraud instance may be an instance where failure of the reception of location information from the user device is based on some input or action performed by a user, rather than due to natural conditions experienced by the user device, thereby indicating potential fraud by the user. In some implementations, the route determination system may determine that each instance of a failure of the reception of location information from the user device is a potential fraud instance. In some implementations, the route determination system may determine that the failure of the reception of location information from the user device is a potential fraud instance if the failure of the reception of location information occurred in a location that is not historically associated with location information reception failures, such as poor MNO coverage areas as described above.

In some implementations, the route determination system may determine that the failure of the reception of location information from the user device is a potential fraud instance based on application data received from the user device. The application data may indicate a channel condition of a cell, of a cellular network, being used by the user device to communicate with the route determination system and/or a remaining battery life of the user device, among other examples. For example, if the application data indicates that the cell (of the cellular network) being used by the user device has good cellular coverage and/or if the remaining battery life of the user device is not low, then the route determination system may determine that the failure of the reception of location information from the user device is a potential fraud instance. If the application data indicates that the cell being used by the user device has poor cellular coverage and/or if the remaining battery life of the user device is low, then the route determination system may determine that the failure of the reception of location information from the user device is not a fraud instance (e.g., because the user device may have poor cellular coverage and/or because the battery of the user device may have died).

Figure 1C:
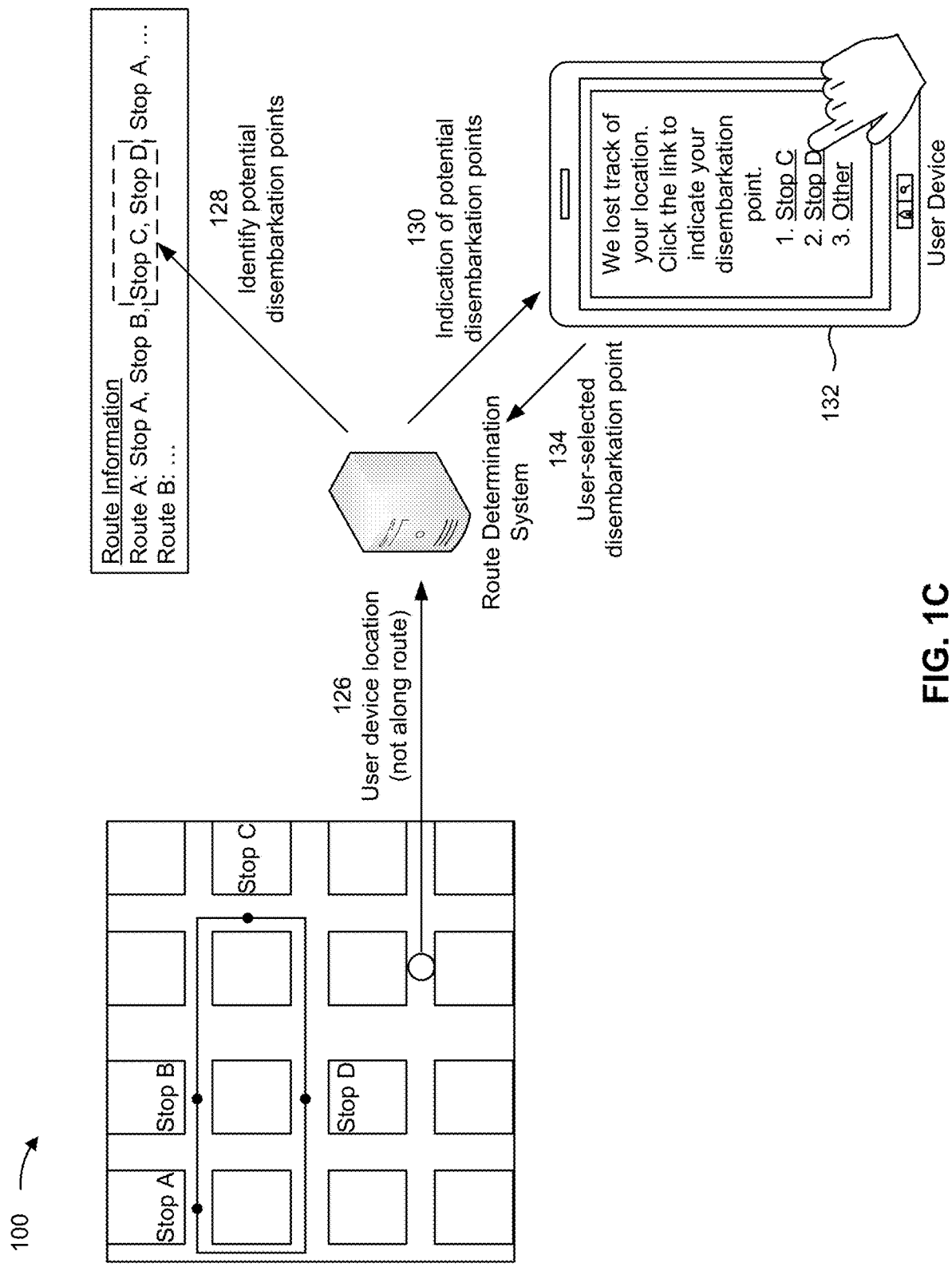

As shown in FIG. 1C, and by reference number 126, the route determination system may receive a user device location after determining that reception of location information from the user device has failed (e.g., a restored user device location). The route determination system may determine whether the restored user device location is located along the route. If the route determination system determines that the restored user device location is located along the route, then the route determination system may disregard the failure of the reception of location information from the user device (e.g., because the user device is still traveling in vehicle A). The route determination system may continue to collect location information from the user device in a similar manner as described above (e.g., according to the polling interval). If the route determination system determines that the restored user device location is not located along the route (e.g., as shown in FIG. 1C), then the route determination system may determine a point (or stop) at which the user device exited or stopped traveling in vehicle A (e.g., a disembarkation point).

As shown by reference number 128, the route determination system may identify one or more potential disembarkation points. In some implementations, the route determination system may identify the one or more potential disembarkation points based on the last known location of the user device (e.g., prior to the restored user device location). The route determination system may identify that the potential disembarkation points include one or more stops along the route subsequent to the last known location of the user device. For example, as described above in connection with FIG. 1B, the last known location of the user device along the route was between stop B and stop C. Therefore, the route determination system may identify that the potential disembarkation points include stops along the route subsequent to stop B (e.g., stop C and stop D).

In some implementations, the route determination system may identify the one or more potential disembarkation points based on the restored user device location. The route determination system may identify that the potential disembarkation points include one or more stops located proximate to the restored user device location. For example, as shown in FIG. 1C, the restored user device location may be located proximate to stop C and stop D. Therefore, the route determination system may identify that the potential disembarkation points include one or more stops along the route subsequent to the last known location of the user device (e.g., stops after stop B) and located proximate to the restored user device location (e.g., stop C and stop D).

In some implementations, as shown by reference number 130, the route determination system may transmit, to the user device, a message that indicates the potential disembarkation points. In some implementations, the route determination system may transmit the message indicating the potential disembarkation points if the route determination system identifies multiple potential disembarkation points. For example, if the route determination system identifies a single potential disembarkation point, the route determination system may determine that the single potential disembarkation point is the actual disembarkation point and not transmit the message indicating the potential disembarkation points.

As shown by reference number 132, the user device may display (via the application) a user interface that displays the potential disembarkation points identified by the route determination system (e.g., stop C and stop D). The user device may display a request for the user to provide an input indicating the actual (e.g., user-selected) disembarkation point from the potential disembarkation points. The user may provide an input to the user device indicating the user-selected disembarkation point. As shown by reference number 134, the user device may transmit, to the route determination system, an indication of the user-selected disembarkation point.

Figure 1D:
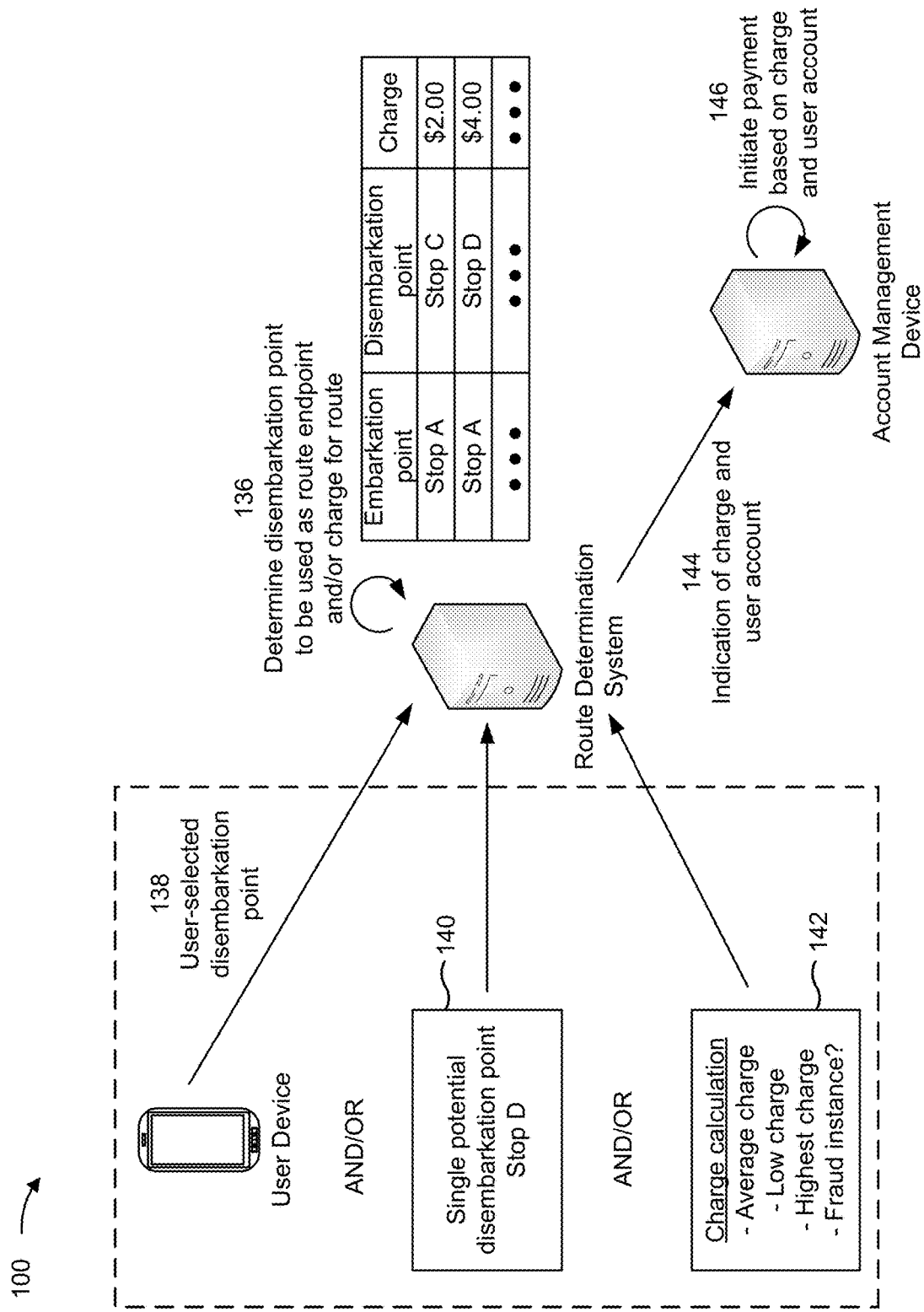

As shown in FIG. 1D, and by reference number 136, the route determination system may determine a disembarkation point to be used as a route endpoint for the user device (e.g., from the potential disembarkation points) and/or a charge to be used for the route based on the potential disembarkation points. The disembarkation point may be the point at which the user device stopped traveling with the vehicle (e.g., while the user device was unable to transmit location information, as described above). As shown by reference number 138, the route determination system may determine the disembarkation point to be used as a route endpoint for the user device based on the user-selected disembarkation point. For example, the route determination system may determine that the disembarkation point to be used as a route endpoint for the user device is the user-selected disembarkation point.

In some implementations, as shown by reference number 140, the route determination system may determine the disembarkation point to be used as a route endpoint for the user device based on the identified potential disembarkation points. For example, the route determination system may determine the disembarkation point to be used as a route endpoint for the user device from the one or more potential disembarkation points identified by the route determination system. In some implementations, the route determination system may determine the disembarkation point to be used as a route endpoint for the user device based on identifying only a single potential disembarkation point.

In some implementations, the route determination system may determine the disembarkation point to be used as a route endpoint for the user device based on historical information associated with the user device. For example, the route determination system may identify, in the historical information, a stop (e.g., a disembarkation point) along the route at which the user device frequently disembarks. The route determination system may determine that the disembarkation point to be used as a route endpoint for the user device is the stop along the route at which the user device frequently disembarks (e.g. if the stop is included in the potential disembarkation points).

In some implementations, the route determination system may determine the disembarkation point to be used as a route endpoint for the user device based on location information of a second user device (e.g., a linked user device) associated with the user device. For example, a user of the user device may be traveling with a user of the linked user device. The route determination system may determine that the user device and the linked user device are traveling together based on comparing location information of the user device and the linked user device. The route determination system may determine that the user device and the linked user device are traveling together based on an indication received from the user device and/or the linked user device. For example, an identifier of the linked user device (e.g., a phone number) may be input to the user device. The user device may provide the indication of the linked user device to the route determination system. The route determination system may determine the disembarkation point to be used as a route endpoint for the user device based on a disembarkation point of the linked user device.

In some implementations, the route determination system may determine the disembarkation point to be used as a route endpoint for the user device based on disembarkation points of other user devices traveling in vehicle A at the same time as the user device. For example, users traveling in vehicle A may be traveling to a common location (e.g., an event or a last stop on the route). The route determination system may determine that multiple (e.g., a majority or all) other user devices traveling in vehicle A at the same time as the user device disembark at the same point. The route determination system may determine that the disembarkation point to be used as the route endpoint for the user device is the disembarkation point of the multiple (e.g., a majority or all) other user devices traveling in vehicle A at the same time as the user device.

In some implementations, the route determination system may determine the disembarkation point to be used as a route endpoint for the user device based on historical information associated with the route. For example, the route determination system may identify one or more stops along the route associated with a high frequency of disembarkations. The route determination system may determine that the disembarkation point to be used as the route endpoint for the user device is the stop along the route associated with a high frequency of disembarkations (e.g., if the stop is included in the identified potential disembarkation points).

As shown by reference number 142, the route determination system may calculate a charge for the route. In some implementations, the route determination system may calculate the charge for the route based on the disembarkation point to be used as the route endpoint for the user device. For example, as shown in FIG. 1D, if the route determination system determines that the disembarkation point is stop D, then the route determination system may identify that the charge for the route is $4.00. If the route determination system determines that the disembarkation point is stop C, then the route determination system may identify that the charge for the route is $2.00.

In some implementations, the route determination system may calculate the charge for the route based on rates stored by the route determination system. For example, the route determination system may store rates for a route for each embarkation point/disembarkation point combination along the route. In some implementations, the route determination system may store rates for different times of use. For example, a rate for the route may be higher during a peak time (e.g., during a time when the route is frequently used) and may be lower during an off-peak time. The route determination system may calculate the charge for the route based on rates stored by the route determination system and/or based on the time that the user device is traveling along the route.

In some implementations, the route determination system may calculate the charge for the route based on an average charge of the identified potential disembarkation points. For example, if the route determination system identifies that the potential disembarkation points include stop C and stop D, then the route determination system may calculate the charge for the route based on the average charge of stop C and stop D (e.g., $3.00). In some implementations, the route determination system may calculate the charge for the route based on a minimum charge of the identified potential disembarkation points. For example, if the route determination system identifies that the potential disembarkation points include stop C and stop D, then the route determination system may calculate the charge for the route based on the minimum charge of stop C and stop D (e.g., $2.00). In some implementations, the route determination system may calculate the charge for the route based on a maximum charge of the identified potential disembarkation points. For example, if the route determination system identifies that the potential disembarkation points include stop C and stop D, then the route determination system may calculate the charge for the route based on the maximum charge of stop C and stop D (e.g., $4.00).

In some implementations, the route determination system may calculate the charge for the route based on a maximum charge for the route. For example, the route determination system may determine a number of fraud instances (or potential fraud instances) indicated or flagged in a user account associated with the user device. If the number of fraud instances satisfies a threshold (e.g., is greater than or equal to the threshold), then the route determination system may calculate the charge for the route based on the maximum charge for the entire route (e.g., if the current instance is also flagged as a potential fraud instance).

As shown by reference number 144, the route determination system may transmit, to an account management device, an indication of the charge and the user account associated with the user device. For example, the route determination system may transmit an indication of the charge amount and an identifier of the user account. As shown by reference number 146, the account management device may initiate a payment for the charge based on receiving the indication of the charge amount and the identifier of the user account. For example, the account management device may add the charge amount to a record of the user account that tracks an amount owed (e.g., over multiple trips) by the user. In some implementations, the account management device may initiate a payment with a transaction backend system to charge a transaction account linked with the user account. For example, the user account may include an identifier of a transaction account to be used to complete payments. The account management device may initiate a payment that is to be completed using resources of the transaction account.

As indicated above, FIGS. 1A-1D are provided as an example. Other examples may differ from what is described with regard to FIGS. 1A-1D.

Figure 2:
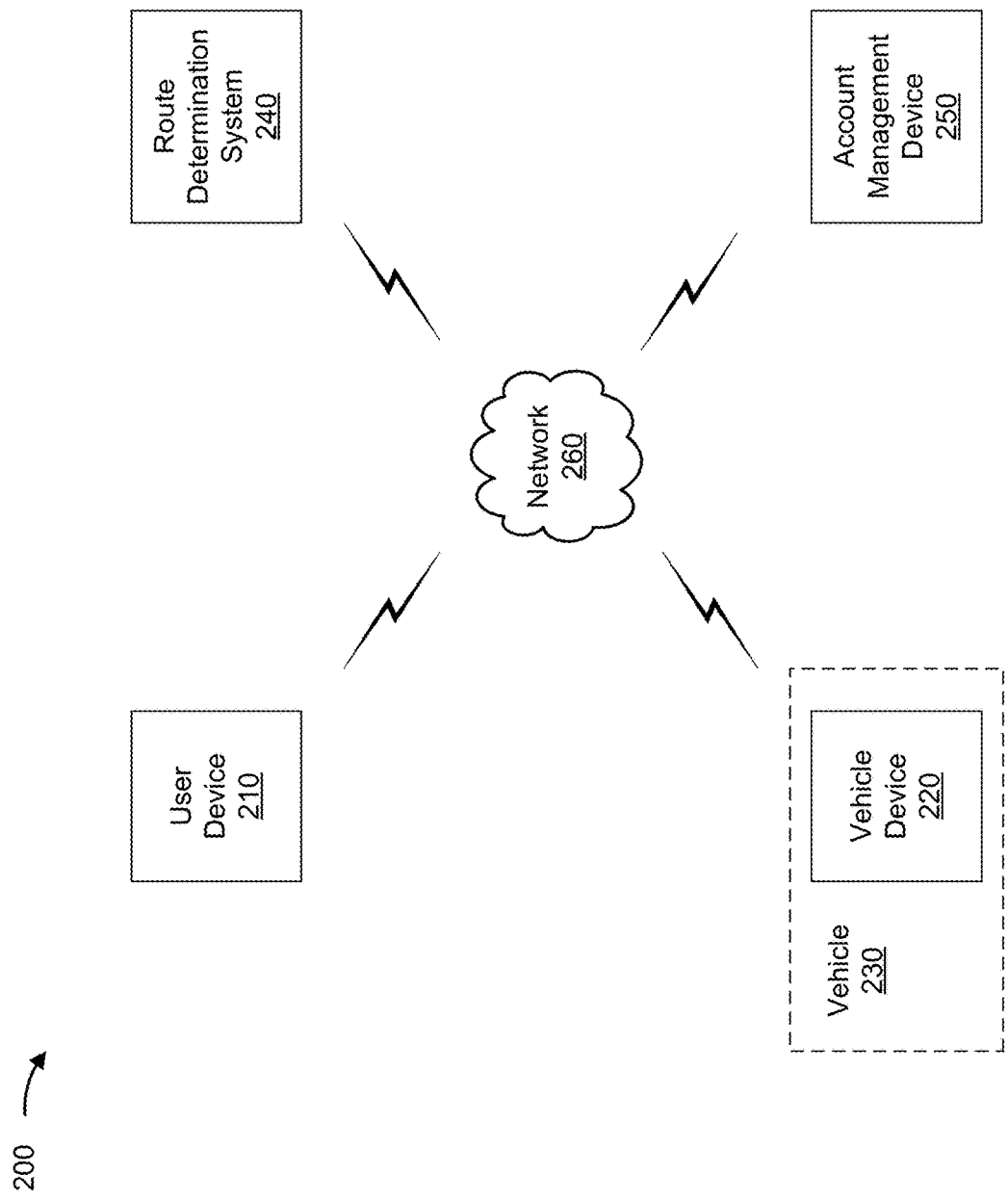
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a vehicle device 220 included in a vehicle 230, a route determination system 240, an account management device 250, and a network 260. Devices of environment 200 may interconnect via wired connections, wireless connections, or a combination of wired and wireless connections.

The user device 210 includes one or more devices capable of receiving, generating, storing, processing, and/or providing information associated with route determination based on a last known position, as described elsewhere herein. The user device 210 may include a communication device and/or a computing device. For example, the user device 210 may include a wireless communication device, a mobile phone, a user equipment, a laptop computer, a tablet computer, a wearable communication device (e.g., a smart wristwatch, a pair of smart eyeglasses, a head mounted display, or a virtual reality headset), or a similar type of device.

The vehicle device 220 may be included in a vehicle 230. The vehicle device 220 includes one or more devices capable of receiving, generating, storing, processing, and/or providing information associated with route determination based on a last known position, as described elsewhere herein. In some implementations, vehicle device 220 may include a device integrated within the vehicle 230, such as an in-vehicle infotainment (IVI) system, an in-car entertainment (ICE) system, a telematics device, a Global Positioning System (GPS) device, or a similar type of device. In some implementations, vehicle device 220 may include a device that is separate from but associated with a vehicle, such as a mobile phone (e.g., a smart phone, a radiotelephone, etc.), a tablet computer, a handheld computer, or a similar type of device.

The route determination system 240 includes one or more devices capable of receiving, generating, storing, processing, providing, and/or routing information associated with route determination based on a last known position, as described elsewhere herein. The route determination system 240 may include a communication device and/or a computing device. For example, the route determination system 240 may include a server, such as an application server, a client server, a web server, a database server, a host server, a proxy server, a virtual server (e.g., executing on computing hardware), or a server in a cloud computing system. In some implementations, the route determination system 240 includes computing hardware used in a cloud computing environment.

The account management device 250 includes one or more devices capable of receiving, generating, storing, processing, providing, and/or routing information associated with route determination based on a last known position, as described elsewhere herein. The account management device 250 may include a communication device and/or a computing device. For example, the account management device 250 may include a server, such as an application server, a client server, a web server, a database server, a host server, a proxy server, a virtual server (e.g., executing on computing hardware), or a server in a cloud computing system. In some implementations, the account management device 250 includes computing hardware used in a cloud computing environment. In some implementations, the account management device 250 may receive instructions from the route determination system 240 to initiate payments for a route, as described elsewhere herein.

The network 260 includes one or more wired and/or wireless networks. For example, the network 260 may include a local area network (e.g., a wired local area network or a wireless local area network (WLAN), such as a Wi-Fi network), a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, the Internet, a fiber optic-based network, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
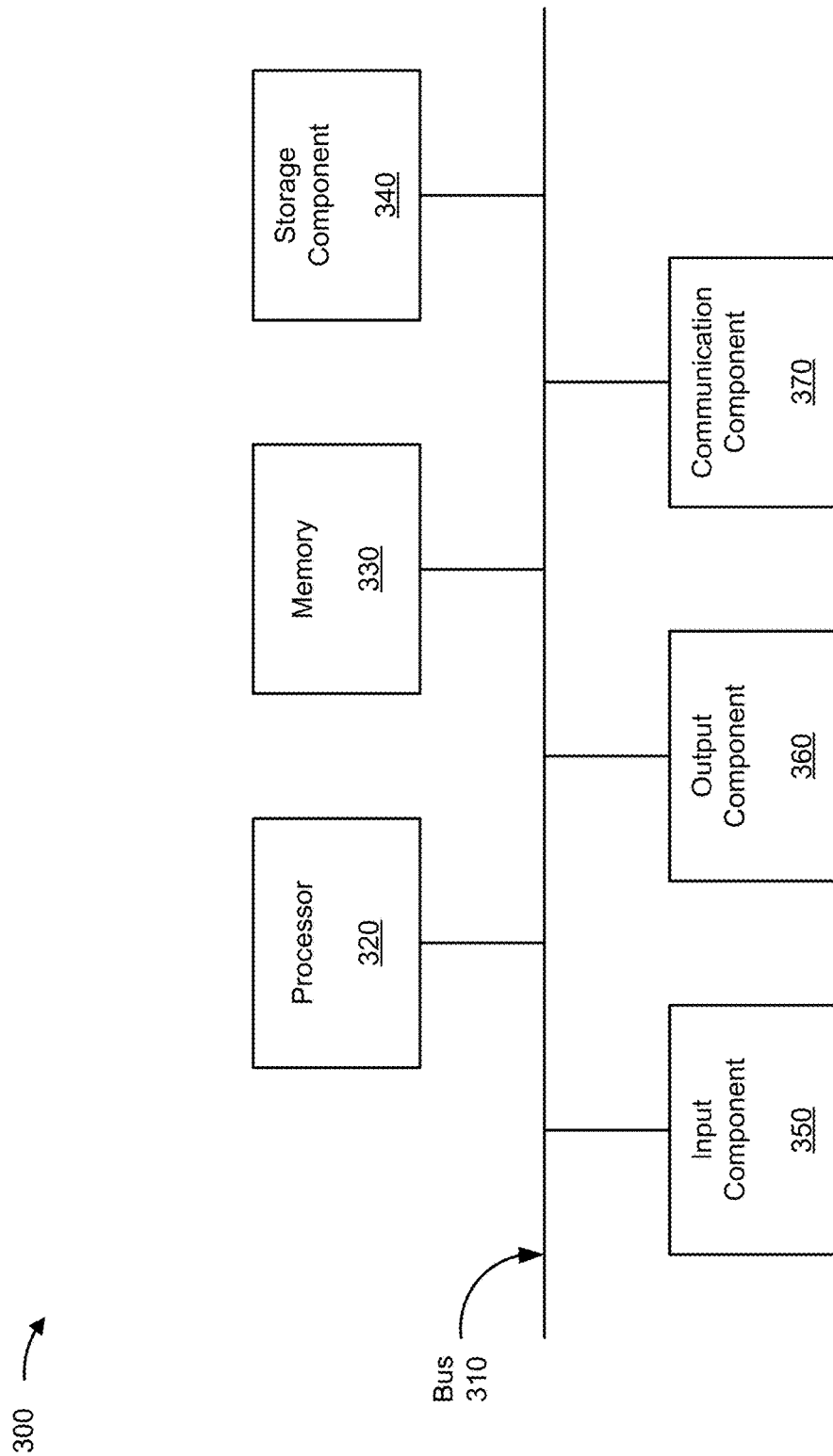
FIG. 3 is a diagram of example components of one or more devices of FIG. 2.

FIG. 3 is a diagram of example components of a device 300, which may correspond to user device 210, vehicle device 220, route determination system 240, and/or account management device 250. In some implementations, user device 210, vehicle device 220, route determination system 240, and/or account management device 250 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
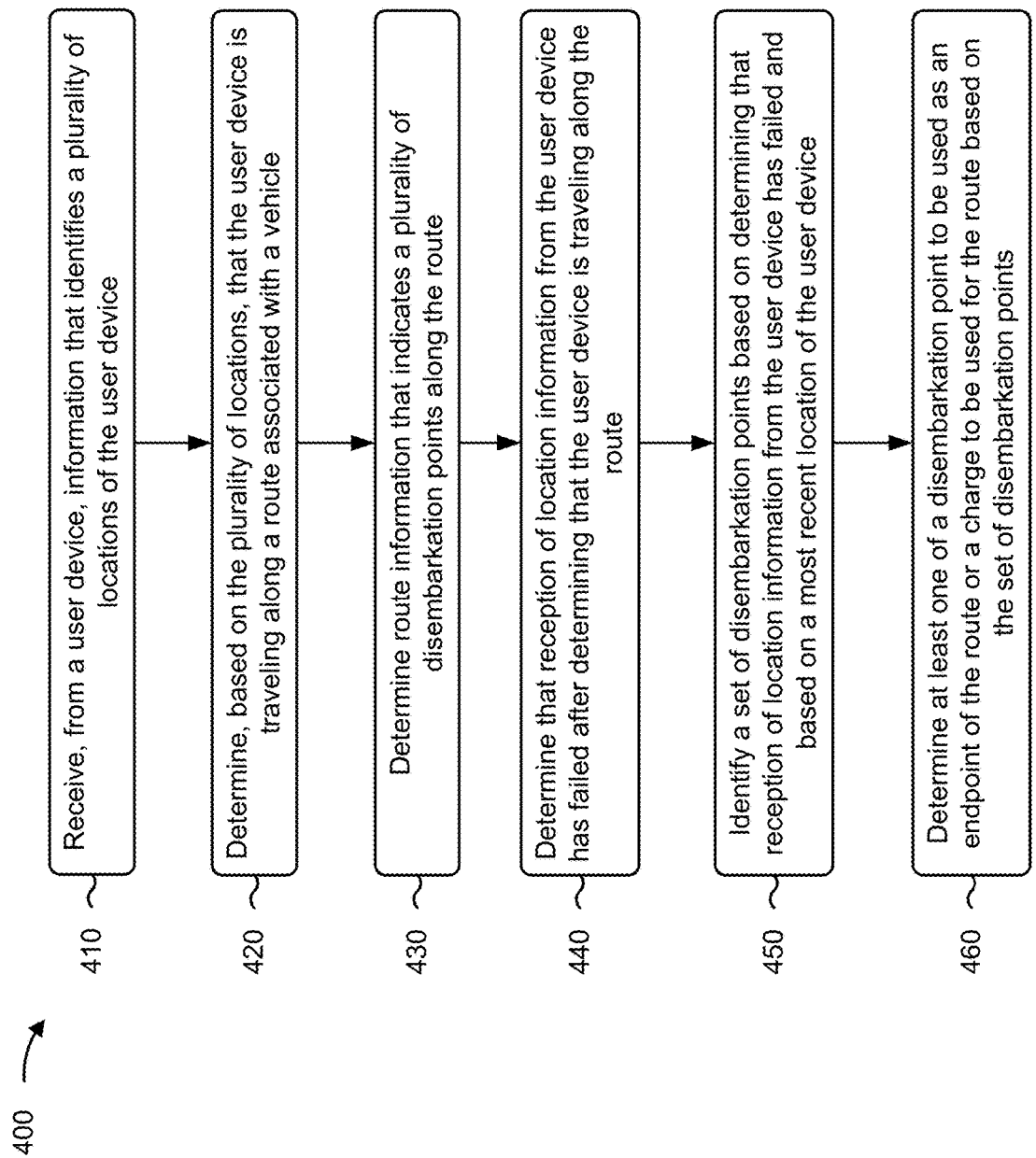
FIG. 4 is a flowchart of an example process relating to route determination based on a last known position.

FIG. 4 is a flowchart of an example process 400 associated with route determination based on a last known position. In some implementations, one or more process blocks of FIG. 4 may be performed by a system (e.g., route determination system 240). In some implementations, one or more process blocks of FIG. 4 may be performed by another device or a group of devices separate from or including the system, such as user device 210, vehicle device 220, and/or account management device 250. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from the user device, information that identifies a plurality of locations of the user device (block 410). As further shown in FIG. 4, process 400 may include determining, based on the plurality of locations, that the user device is traveling along the route associated with the vehicle (block 420). As further shown in FIG. 4, process 400 may include determining route information that indicates a plurality of disembarkation points along the route (block 430). As further shown in FIG. 4, process 400 may include determining that reception of location information from the user device has failed after determining that the user device is traveling along the route (block 440). As further shown in FIG. 4, process 400 may include identifying a set of disembarkation points, of the plurality of disembarkation points, based on determining that reception of location information from the user device has failed and based on a most recent location, of the plurality of locations, of the user device (block 450). As further shown in FIG. 4, process 400 may include determining at least one of a disembarkation point to be used as an endpoint of the route or a charge to be used for the route based on the set of disembarkation points (block 460). In some implementations, process 400 may include performing an action based on determining the at least one of the disembarkation point to be used as an endpoint of the route or the charge to be used for the route based on the set of disembarkation points. For example, the action may include transmitting information that indicates the charge and a user account associated with the user device to cause the charge to be completed, reporting potential fraud instances (e.g., to an institution, an MNO, and/or a law enforcement agency), banning a user due to one or more fraud instances, among other examples.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for determining a route associated with a user device traveling in a vehicle after reception of location information from the user device fails, the system comprising:
   memory; and
   one or more processors, communicatively coupled to the memory, configured to:
      determine, based on a first location of the user device at a first time, that the user device is traveling in the vehicle, wherein the vehicle is associated with the route;
      determine route information that indicates the route associated with the vehicle in which the user device is traveling, wherein the route information identifies a plurality of disembarkation points associated with the route;
      receive information that indicates a second location of the user device at a second time subsequent to the first time;
      determine that reception of location information from the user device has failed after receiving the information that indicates the second location of the user device;
      identify one or more disembarkation points, of the plurality of disembarkation points, based on determining that reception of location information has failed, based on the route information, and based on the second location of the user device; and
      transmit, to the user device, a message that indicates the one or more disembarkation points.

2. The system of claim 1, wherein the one or more processors are further configured to:
   receive information that indicates a third location of the user device at a third time subsequent to the second time; and
   determine, based on the route information, that the third location is not along the route; and
   wherein the one or more processors, when identifying the one or more disembarkation points, are configured to
   identify the one or more disembarkation points further based on the third location.

3. The system of claim 2, wherein the one or more disembarkation points are located along the route subsequent to the second location, and include each disembarkation point prior to and including a disembarkation point that is closest in proximity to the third location.

4. The system of claim 1, wherein the one or more processors are further configured to:
   determine that the one or more disembarkation points include multiple disembarkation points; and
   wherein the one or more processors, when transmitting the message to the user device, are configured to transmit the message to the user device based on determining that the one or more disembarkation points include multiple disembarkation points.

5. The system of claim 1, wherein the one or more processors, when determining that reception of location information from the user device has failed, are further configured to:
   determine that reception of location information from the user device has failed based on determining that a threshold amount of time has elapsed, wherein the threshold amount of time is based on the route information.

6. The system of claim 5, wherein the threshold amount of time is based on at least one of:
   a distance or a time between at least two disembarkation points of the plurality of disembarkation points,
   an average distance or an average time between consecutive disembarkation points of the plurality of disembarkation points,
   the second location, or
   a polling interval configured for the user device.

7. The system of claim 1, wherein the one or more processors are further configured to:
   receive, from the user device, information that indicates a selected disembarkation point of the one or more disembarkation points;
   calculate a charge based on the selected disembarkation point; and
   transmit, to an account management device, information that indicates the charge and a user account associated with the user device.

8. The system of claim 1, wherein the one or more processors are further configured to:
   determine a polling interval, to be used to request or receive location information from the user device, based on the route information; and
   obtain location information from the user device based on the polling interval.

9. A method for determining a disembarkation point along a route associated with a user device traveling in a vehicle after reception of location information from the user device fails, the method comprising:
   receiving, by a system and from the user device, information that identifies a plurality of locations of the user device;
   determining, by the system and based on the plurality of locations, that the user device is traveling along the route associated with the vehicle;
   determining, by the system, route information that indicates a plurality of disembarkation points along the route;
   determining, by the system, that reception of location information from the user device has failed after determining that the user device is traveling along the route;

identifying, by the system, a set of disembarkation points, of the plurality of disembarkation points, based on determining that reception of location information from the user device has failed and based on a most recent location, of the plurality of locations, of the user device; and determining, by the system, at least one of a disembarkation point to be used as an endpoint of the route or a charge to be used for the route based on the set of disembarkation points.

10. The method of claim 9, further comprising receiving information that indicates a subsequent location of the user device after determining that reception of location information from the user device has failed; and wherein the set of disembarkation points includes one or more disembarkation points that are located along the route subsequent to the most recent location of the user device, and includes each disembarkation point prior to and including a disembarkation point that is closest in proximity to the subsequent location.

11. The method of claim 9, further comprising determining whether the set of disembarkation points includes multiple disembarkation points; and selectively transmitting a message, that identifies the set of disembarkation points, to the user device based on determining whether the set of disembarkation points includes multiple disembarkation points,
wherein the message is transmitted if the set of disembarkation points includes multiple disembarkation points, or
wherein the message is not transmitted if the set of disembarkation points includes a single disembarkation point.

12. The method of claim 9, wherein determining at least one of the disembarkation points to be used as the endpoint of the route or the charge to be used for the route comprises:

determining the charge to be used for the route based on:
the disembarkation point to be used as the endpoint of the route, wherein the disembarkation point is included in the set of disembarkation points,
an average charge associated with the set of disembarkation points,
a highest charge associated with the set of disembarkation points, or
a maximum charge associated with the route.

13. The method of claim 9, further comprising determining a quantity of fraud instances associated with the user device; and wherein determining at least one of the disembarkation point to be used as the endpoint of the route or the charge to be used for the route comprises determining the disembarkation point or the charge based on the quantity of fraud instances.

14. The method of claim 9, further comprising determining whether failure to receive location information from the user device is a fraud instance based on application data received from the user device, wherein the application data includes at least one of:

information that indicates a channel condition of a cell, of a cellular network, being used by the user device to communicate, or
information that indicates a remaining battery life of the user device.

15. A non-transitory computer-readable medium storing a set of instructions for determining a disembarkation point along a route associated with a user device traveling in a vehicle after reception of location information from the user device fails, the set of instructions comprising:

one or more instructions that, when executed by one or more processors of a system, cause the system to:
determine, based on a location of the user device, that the user device is traveling in the vehicle;
determine route information that indicates the route associated with the vehicle in which the user device is traveling, wherein the route information identifies:
a plurality of disembarkation points associated with the route, and
a distance or a time between consecutive disembarkation points of the plurality of disembarkation points;
determine a polling interval, to be used to receive location updates from the user device, based on the distance or the time between consecutive disembarkation points;
obtain one or more location updates from the user device based on the polling interval;
determine, based on expiration of a timer that has a duration that is based on the polling interval, that reception of location information from the user device has failed;
identify one or more disembarkation points, of the plurality of disembarkation points, based on determining that reception of location information has failed, based on the route information, and based on a most recent location update of the one or more location updates; and
determine at least one of a disembarkation point to be used as an endpoint of the route or a charge to be used for the route based on the one or more disembarkation points.

16. The non-transitory computer-readable medium of claim 15, wherein the one or more instructions, that cause the system to obtain the one or more location updates from the user device based on the polling interval, cause the system to:

transmit periodic requests for the location updates according to the polling interval, or
transmit an instruction, to the user device, that identifies the polling interval and that instructs the user device to transmit the location updates according to the polling interval.

17. The non-transitory computer-readable medium of claim 15, wherein the one or more instructions, when executed by the one or more processors, further cause the system to:

determine a second distance or a second time between a location of the user device, indicated in the one or more location updates, and a next disembarkation point along the route;
determine an updated polling interval based on the second distance or the second time; and
obtain one or more additional location updates from the user device based on the updated polling interval.

18. The non-transitory computer-readable medium of claim 15, wherein the polling interval is a shorter interval if the distance or the time between consecutive disembarkation points is smaller, or is a longer interval if the distance or the time between consecutive disembarkation points is larger.

19. The non-transitory computer-readable medium of claim 15, wherein the one or more instructions, when executed by the one or more processors, further cause the system to:

determine a speed of the user device or the vehicle;

determine an updated polling interval based on the speed; and obtain one or more additional location updates from the user device based on the updated polling interval.

20. The non-transitory computer-readable medium of claim 15, wherein the one or more instructions, when executed by the one or more processors, further cause the system to:

determine a mobile network operator associated with the user device;

determine a cellular network coverage parameter associated with the mobile network operator and one or more upcoming locations along the route; and wherein the one or more instructions, that cause the system to determine the polling interval, further cause the system to determine the polling interval based on the cellular network coverage parameter.

\* \* \* \* \*